(12) United States Patent
Oketani

(10) Patent No.: US 11,462,956 B2
(45) Date of Patent: Oct. 4, 2022

(54) ELECTRIC MOTOR, COMPRESSOR, AIR CONDITIONER, AND MANUFACTURING METHOD OF ELECTRIC MOTOR

(71) Applicant: Mitsubishi Electric Corporation, Tokyo (JP)

(72) Inventor: Naohiro Oketani, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 175 days.

(21) Appl. No.: 16/766,374

(22) PCT Filed: Nov. 29, 2017

(86) PCT No.: PCT/JP2017/042789
§ 371 (c)(1),
(2) Date: May 22, 2020

(87) PCT Pub. No.: WO2019/106751
PCT Pub. Date: Jun. 6, 2019

(65) Prior Publication Data
US 2020/0381961 A1    Dec. 3, 2020

(51) Int. Cl.
*H02K 1/16* (2006.01)
*H02K 1/24* (2006.01)
*H02K 21/14* (2006.01)

(52) U.S. Cl.
CPC .............. *H02K 1/165* (2013.01); *H02K 1/24* (2013.01); *H02K 21/14* (2013.01)

(58) Field of Classification Search
CPC ............ H02K 1/165; H02K 1/24; H02K 1/18; H02K 1/185; H02K 21/14; H02K 21/12; H02K 2201/03

USPC ................. 310/195, 400, 404, 411
See application file for complete search history.

(56) References Cited

U.S. PATENT DOCUMENTS

| | | | |
|---|---|---|---|
| 2011/0006620 A1* | 1/2011 | Kawasaki | H02K 1/148 310/46 |
| 2013/0119835 A1* | 5/2013 | Yoshikawa | H02K 1/2706 310/156.08 |
| 2014/0210284 A1* | 7/2014 | Banba | H02K 15/024 310/43 |
| 2017/0098970 A1* | 4/2017 | Tsuchida | F04C 23/008 |

FOREIGN PATENT DOCUMENTS

| | | |
|---|---|---|
| JP | 2007-104782 A | 4/2007 |
| JP | 2009-095130 A | 4/2009 |
| JP | 2009095130 A * | 4/2009 |
| JP | 2016-136812 A | 7/2016 |

OTHER PUBLICATIONS

Machine translation of JP-2009095130-A. (Year: 2009).*

* cited by examiner

*Primary Examiner* — Michael Andrews
(74) *Attorney, Agent, or Firm* — Posz Law Group, PLC

(57) ABSTRACT

An electric motor includes a rotor and a stator. The rotor includes a rotor core, a first rotor end and a second rotor end. The stator includes a stator core, a first plate formed in an L shape in a cross section, and a second plate formed in an L shape in a cross section. The first plate includes a first facing part facing the rotor core and a first base part. The second plate includes a second facing part facing the rotor core and a second base part. The first facing part and the second facing part adjoin in a circumferential direction with a gap in between.

15 Claims, 6 Drawing Sheets

ELECTRIC MOTOR, COMPRESSOR, AIR CONDITIONER, AND MANUFACTURING METHOD OF ELECTRIC MOTOR

CROSS REFERENCE TO RELATED APPLICATION

This application is a U.S. national stage application of PCT/JP2017/042789 filed on Nov. 29, 2017, the contents of which are incorporated herein by reference.

TECHNICAL FIELD

The present invention relates to an electric motor.

BACKGROUND ART

In general, for downsizing electric motors, electric motors each designed so that a stator is shorter than a rotor in an axial direction are being used. In the case where a permanent magnet for forming a magnetic pole is fixed to a rotor, magnetic flux from the rotor flows into a stator and thus a magnetic circuit is formed in an electric motor. The amount of the magnetic flux flowing from the rotor into the stator influences the motor efficiency. Thus, in the electric motors designed so that the stator is shorter than the rotor in the axial direction as mentioned above, the area of the stator facing the rotor decreases and the amount of the magnetic flux flowing from the rotor into the stator decreases. As a result, a problem arises in that the motor efficiency of the electric motor decreases. To resolve this problem, there has been proposed an electric motor designed so as to increase the area of a stator facing a rotor (see Patent Reference 1, for example).

PRIOR ART REFERENCE

Patent Reference

Patent Reference 1: Japanese Patent Application Publication No. 2009-95130

SUMMARY OF THE INVENTION

Problem to be Solved by the Invention in the stator described in the Patent Reference 1, grooves for reducing an eddy current is formed in a plate-like member forming the stator by means of punching processing. However, it is difficult by the punching processing to form grooves narrower than the thickness of the plate-like member. Accordingly, the stator having the grooves formed in one plate-like member by the punching processing has a problem in that the proportion of the grooves on the surface of the stator facing the rotor is large. Consequently, a problem arises in that the amount of the magnetic flux flowing from the rotor into the stator decreases and the motor efficiency of the electric motor decreases.

An object of the present invention is to improve the motor efficiency of an electric motor.

Means for Solving the Problem

An electric motor according to the present invention includes: a stator including a stator core having a first core end situated on a first side in an axial direction and a second core end situated on a second side opposite to the first side in the axial direction, a first plate formed in an shape in a cross section, and a second plate formed in an L shape in a cross section; and a rotor disposed inside the stator and including a rotor core, a first rotor end situated on the first side of the rotor core, and a second rotor end situated on the second side of the rotor core. The rotor core is longer than the stator core in the axial direction. The first rotor end is situated outwardly away from the first core end in the axial direction. The first plate and the second plate are disposed on the first side of the stator core. The first plate includes a first facing part facing the rotor core and a first base part provided on the first side of the stator core. The second plate includes a second facing part facing the rotor core and a second base part provided on the first side of the stator core. The first facing part and the second facing part adjoin in a circumferential direction with a gap in between.

Effect of the Invention

According to the present invention, the motor efficiency of the electric motor can be improved.

MODE FOR CARRYING OUT THE INVENTION

First Embodiment

Figure 1:
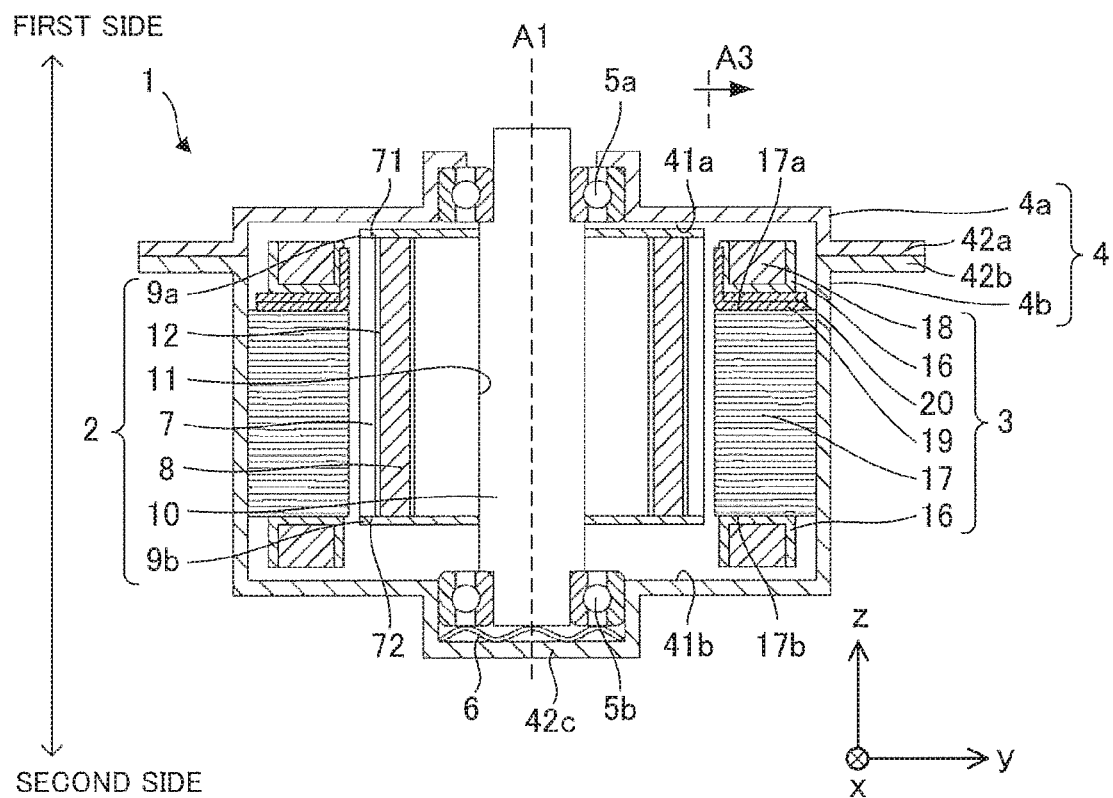
FIG. 1 is a vertical sectional view schematically showing a structure of an electric motor according to a first embodiment of the present invention.

FIG. 1 is a vertical sectional view schematically showing a structure of an electric motor 1 according to a first embodiment of the present invention.

In an xyz orthogonal coordinate system shown in each drawing, a z-axis direction (z-axis) represents a direction parallel to an axis line A1 of a shaft 10 of the electric motor 1 (i.e., rotation axis of a rotor 2) (referred to also as an "axial direction of the rotor 2" or simply as an "axial direction"), an x-axis direction (x-axis) represents a direction orthogonal to the z-axis direction (z-axis), and a y-axis direction represents a direction orthogonal to both of the z-axis direction and the x-axis direction.

The electric motor 1 is an IPM (Interior Permanent Magnet) motor of the inner rotor type, for example.

The electric motor 1 includes the rotor 2, a stator 3, a frame 4 that is a metallic frame as a metallic component, a bearing 5a, a bearing 5b, and a compression spring 6. In the following description, an upper side (i.e., +z side) in FIG. 1 will be referred to as a first side (referred to also as an A side), and a lower side (i.e., −z side) will be referred to as a second side (referred to also as a B side) In the example shown in FIG. 1, the first side is the load side of the electric motor 1 and the second side is the anti-load side of the electric motor 1; however, it is permissible even if the second side is the load side and the first side is the anti-load side.

The bearing 5a and the bearing 5b rotatably support the rotor 2. The bearing 5a is fixed on the first side of the frame 4 (specifically, on a frame part 4a), while the bearing b is fixed on the second side of the frame 4 (specifically, on a frame part 4b).

The frame 4 covers the stator 3. At least part of the frame 4 is exposed to the outside of the electric motor 1. The frame 4 is formed of metallic material such as iron or aluminum. In this embodiment, the frame 4 is composed of the frame parts 4a and 4b. Specifically, the frame 4 is separated into two frames (i.e., the frame parts a and 4b) by a plane orthogonal to the rotation axis of the rotor 2. Each of the frame parts 4a and 4b is formed in a cuplike shape.

The frame 4 has an interior surface 41a (first interior surface) formed on one side (the first side shown in FIG. 1) in the axial direction and an interior surface 41b (second interior surface) formed on the other side (the second side shown in FIG. 1) in the axial direction.

The frame part 4a has a flange part 42a formed on an opening side and the interior surface 41a. The frame part 4a supports the first side of the rotor 2 via the bearing 5a.

The frame part 4b has a flange part 42b formed on an opening side, the interior surface 41b, and a bottomed part 42c. The frame part 4b supports the second side of the rotor 2 via the bearing 5b. The stator 3 is fixed in the frame part 4b.

The flange part 42a of the frame part 4a is in contact with the flange part 42b of the frame part 4b. The flange part 42a of the frame part 4a is fixed to the flange part 42b of the frame part 4b by an adhesive agent, screws or welding, for example.

The compression spring 6 is disposed between the bottomed part 42c of the frame part 4b and the bearing 5b. The compression spring 6 provides a preload to the bearing 5b. Accordingly, the preload is provided also to the bearing 5a. As the compression spring 6, a wave washer or the like is used, for example.

The rotor 2 includes a rotor core 7, permanent magnets 8, an end plate 9a, an end plate 9b and the shaft 10. The rotor 2 is disposed inside the stator 3.

The rotor core 7 includes a first rotor end 71 situated on the first side of the rotor core 7 and a second rotor end 72 situated on the second side of the rotor core 7. The rotor core 7 is formed by, for example, stacking a plurality of electromagnetic steel sheets punched out in a predetermined shape in the axial direction. The cross-sectional shape (i.e., plan-view shape orthogonal to the axial direction) of the rotor core 7 is a circular shape. A shaft hole 11 and magnet insertion holes 12 are formed in the rotor core 7.

The shaft hole 11 is a through hole formed in the axial direction. The shaft 10 is inserted in the shaft hole 11. The center of the shaft hole 11 in a radial direction of the rotor 2 (referred to also as a "radial direction of the stator 3" or simply as a "radial direction") coincides with the center of the rotor core 7 in the radial direction.

In this embodiment, a plurality of magnet insertion holes 12 are formed in the rotor core 7 at even intervals in a circumferential direction of the rotor 2 around the axis line A1 (referred to also as a "circumferential direction of the stator 3" or simply as a "circumferential direction"). The magnet insertion hole 12 is a through hole formed in the axial direction. Each magnet insertion hole 12 is formed closer to an outer circumferential surface of the rotor core 7 than the shaft hole 11. In each magnet insertion hole 12, the permanent magnet 8 is inserted.

The permanent magnet 8 is a rare-earth magnet, for example. The shape of the permanent magnet 8 is a rectangular prism, for example.

The end plates 9a and 9b respectively cover openings of the magnet insertion hole 12 on the first side and the second side, by which the permanent magnet 8 is prevented from coming off the magnet insertion hole 12.

The cross-sectional shape (i.e., plan-view shape orthogonal to the axial direction) of the shaft 10 is a circular shape, for example. The shaft 10 is rotatably supported by the bearing 5a and the bearing 5b.

The stator 3 includes a stator core 17 formed in a ring-like shape, an insulator 16 for electrically insulating a winding 18, a first plate 19, a second plate 20, and the winding 18 wound around the stator core 17 with the insulator 16 in between, the first plate 19 and the second plate 20. The stator 3 is formed in the circumferential direction in a ring-like shape. The stator 3 (specifically, the stator core 17) is held by the frame 4 (specifically, the frame part 4b). Inside the stator 3, the rotor 2 is provided to be rotatable.

The stator 3 is fixed in the frame 4 (specifically, the frame part 4b) by means of press fitting, welding or the like, and an outer circumferential surface of the stator core 17 is in contact with an inner surface of the frame part 4b.

The stator core 17 is formed by stacking a plurality of electromagnetic steel sheets punched out in a predetermined shape in the axial direction. The stator core 17 includes, for example, at least one yoke part (referred to also as a core back) and a plurality of tooth parts projecting inward in the radial direction. In this case, the plurality of tooth parts are arranged in a radial pattern around the axis line A1 and arranged at even intervals in the circumferential direction. A tip end of each tooth part inside in the radial direction faces the rotor 2. An air gap is formed between the tip end of the tooth part and the rotor 2.

The stator core 17 includes a first core end 17a and a second core end 17b. The first core end 17a is situated on the first side in the axial direction. The second core end 17b is situated on the second side opposite to the first side in the axial direction.

The rotor core 7 is longer than the stator core 17 in the axial direction. At least one of the both ends of the rotor core 7 is situated outwardly away from one end of the stator core 17 in the axial direction. In this embodiment, the first rotor end 71 is situated outwardly away from the first core end 17a of the stator core 17 in the axial direction. It is permissible even if the second rotor end 72, instead of the first rotor end 71, is situated outwardly away from the second core end 17b of the stator core 17 in the axial direction.

The first plate 19 and the second plate 20 are disposed on the first side of the stator core 17. The second plate 20 is overlaid on the first plate 19 in the axial direction.

Figure 2:
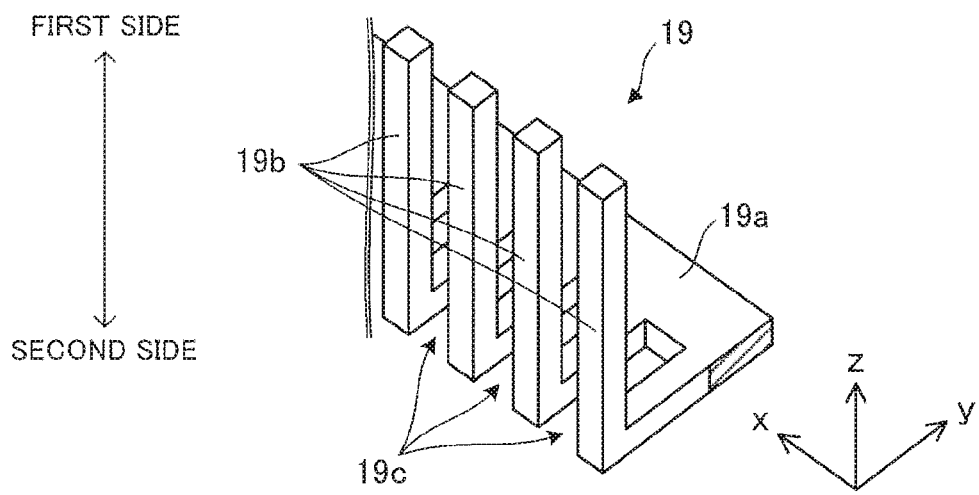
FIG. 2 is a perspective view schematically showing a structure of a part of a first plate.

FIG. 2 is a perspective view schematically showing a structure of a part of the first plate 19. The structure of the second plate 20 is the same as that of the first plate 19.

The first plate 19 is composed of electromagnetic steel sheets, for example. The first plate 19 is formed in an L shape in a cross section. In other words, as shown in FIG. 1, the first plate 19 is formed so that its cross-sectional shape on a zy plane is an L shape. The shape of the first plate 19 on an xy plane is formed in the same shape as the shape of the tooth part of the stator core 17 on an xy plane, for example.

The first plate 19 includes a first base part 19a, at least one first facing part 19b, and at least one first slit 19c.

The first base art 19a is provided on the first side of the stator core 17 (specifically, on the first core end 17a). It is permissible even if a plurality of first plates 19 are provided on the first side of the stator core 17. The first facing part 19b faces the rotor core 7. The first facing part 19b extends in the axial direction.

The first slit 19c is formed in the radial direction between two first facing parts 19b. In other words, the first slit 19c is formed inside the first base part 19a in regard to the radial direction. That is, the first slit 19c extends in the radial direction. Accordingly, a gap passing in the axial direction is formed between two first facing parts 19b adjoining each other.

The second plate 20 is composed of electromagnetic steel sheets, for example. The second plate 20 is formed in an L shape in a cross section. In other words, as shown in FIG. 1, the second plate 20 is formed so that its cross-sectional shape on a ZY plane is an L shape. The shape of the second plate 20 on an xy plane is formed in the same shape as the shape of the tooth part of the stator core 17 on an xy plane, for example. The materials of the first plate 19 and the second plate 20 may differ from each other.

Figure 3:
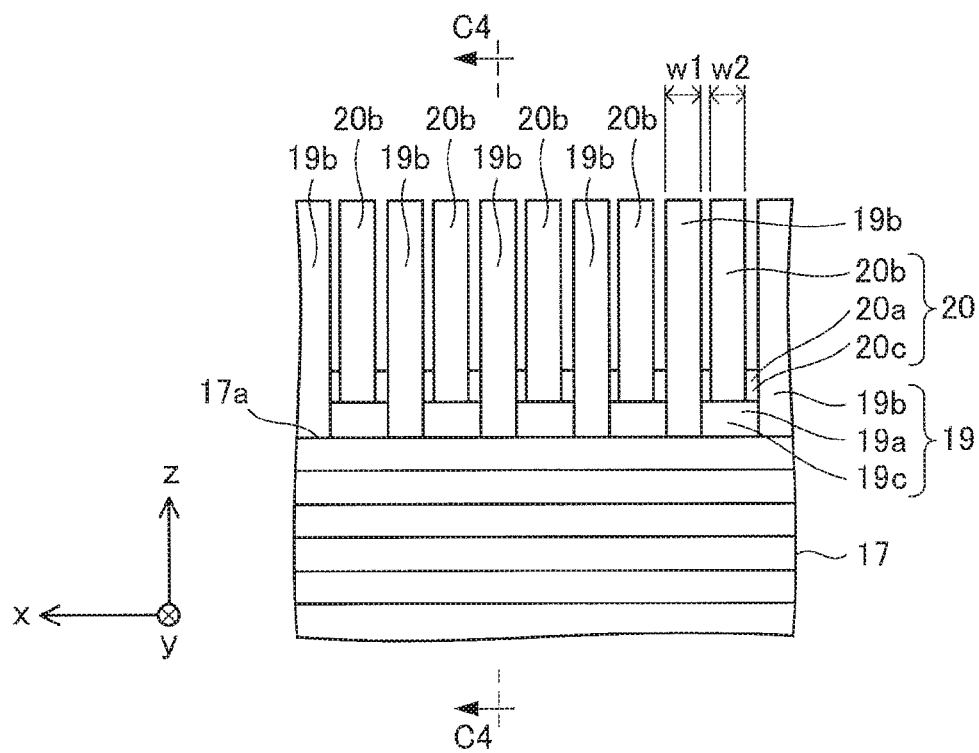
FIG. 3 is a diagram schematically showing a structure of the first plate, a second plate and a stator core viewed in the direction of the arrow A3 shown in FIG. 1.

The second plate 20 includes a second base part 20a, at least one second facing part 20b, and at least one second slit 20c (FIG. 3).

The second base part 20a is provided on the first side of the stator core 17. Specifically, the second base part 20a is overlaid on the first base part 19a in the axial direction. It is permissible even if a plurality of second plates 20 are provided on the first side of the stator core 17. The second facing part 20b faces the rotor core 7. The second facing part 20b extends in the axial direction.

The second slit 20c is formed in the radial direction between two second facing parts 20b. In other words, the second slit 20c is formed inside the second base part 20a in regard to the radial direction. That is, the second slit 20c extends in the radial direction. Accordingly, a gap passing in the axial direction is formed between two second facing parts 20b adjoining each other.

Figure 4:
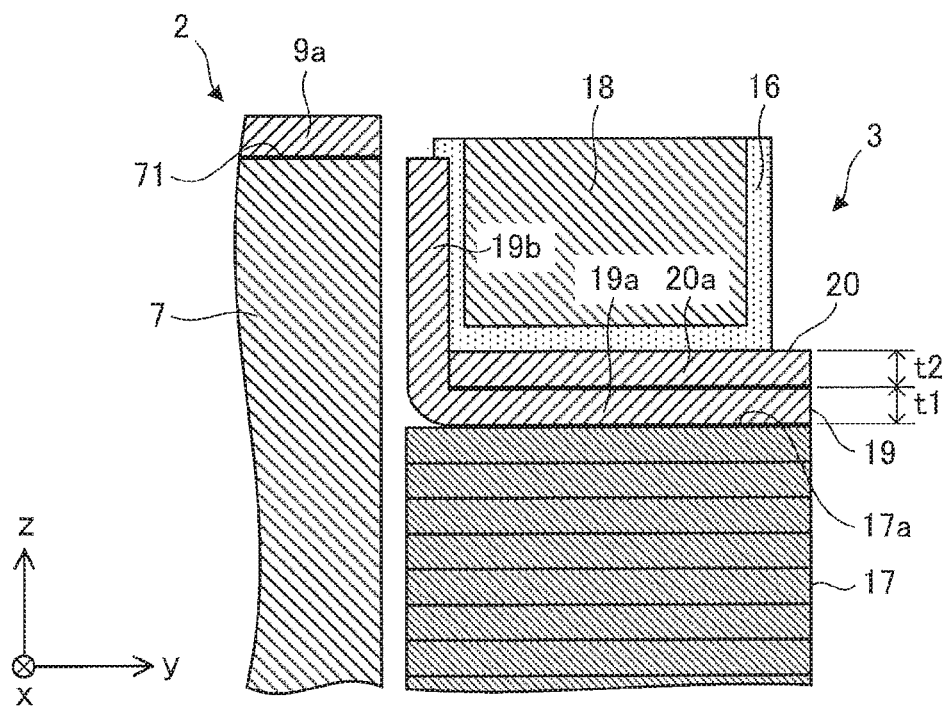
FIG. 4 is a cross-sectional view along the line C4-C4 shown in FIG. 3.

FIG. 3 is a diagram schematically showing a structure of the first plate 19, the second plate 20 and the stator core 17 viewed in the direction of the arrow A3 shown in FIG. 1. FIG. 4 is a cross-sectional view along the line C4-C4 shown in FIG. 3.

A part of the first facing part 19b is situated in the second slit 20c of the second plate 20. Accordingly, as shown in FIG. 3, the first facing part 19b and the second facing part 20b adjoin in the circumferential direction with a gap in between. As shown in FIG. 4, the first facing part 19b and the second facing part 20b face a part of the rotor core 7 extending outside the stator core 1 in the axial direction.

The first facing part 19b, the second facing part 20b and an inner surface of the stator core 17 in regard to the radial direction form an inner surface of the stator 3 facing the rotor 2.

In this embodiment, the first plate 19 includes a plurality of first facing parts 19b, and the second plate 20 also includes a plurality of second facing parts 20b. Therefore, the first facing parts 19b and the second facing parts 20b are arranged alternately in the circumferential direction with a gap in between as shown in FIG. 3. Widths of a plurality of gaps in the cirumferential direction may differ from each other.

In the axial direction, an end of the first facing part 19b, an end of the second facing part 20b and the first rotor end 71 coincide with each other.

When t1 represents the thickness of the first base part 19a in the axial direction and w1 represents the width of the first facing part 19b in the circumferential direction, the relationship between t1 and w1 satisfies $w1 \geq (2/3) \times t1$. Similarly, when t2 represents the thickness of the second base part 20a in the axial direction and w2 represents the width of the second facing part 20b in the circumferential direction, the relationship between t2 and w2 satisfies $w2 \geq (2/3) \times t2$.

Further, the relationship between t1 and w1 is desired to satisfy $t1 \geq w1$. Similarly, the relationship between t2 and w2 is desired to satisfy $t2 \geq w2$.

In this embodiment, the width w1 of the first facing part 19b equals the width w2 of the second facing part 20b (i.e., w1=w2). However, the widths w1 and w2 may differ from each other, and the thicknesses t1 and t2 may also differ from each other.

Figure 5:
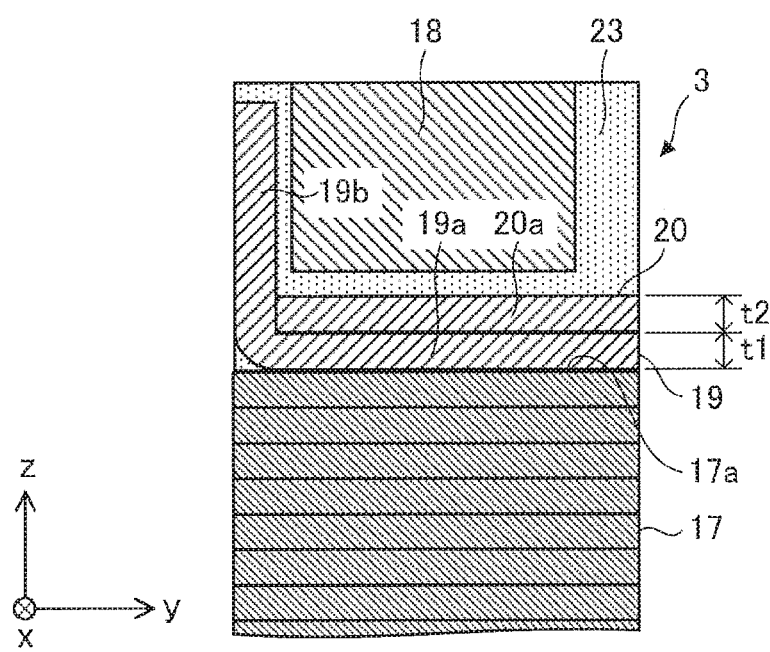
FIG. 5 is a cross-sectional view showing another structure of a stator.

FIG. 5 is a cross-sectional view showing another structure of the stator 3.

The stator 3 may include a resin 23 instead of the insulator 16. The resin 23 integrates the second plate 20 with the first plate 19. That is, the second plate 20 is integrated with the first plate 19 by the resin 23. Accordingly, the resin 23 integrates the second facing parts 20b with the first facing parts 19b. The resin 23 is provided between the first plate 19 and the winding 18. Similarly, the resin 23 is provided also between the second plate 20 and the winding 18. The resin 23 is, for example, a material that insulates the first plate 19 and the second plate 20.

Next, a manufacturing method of the electric motor 1 will be described below.

Figure 6:
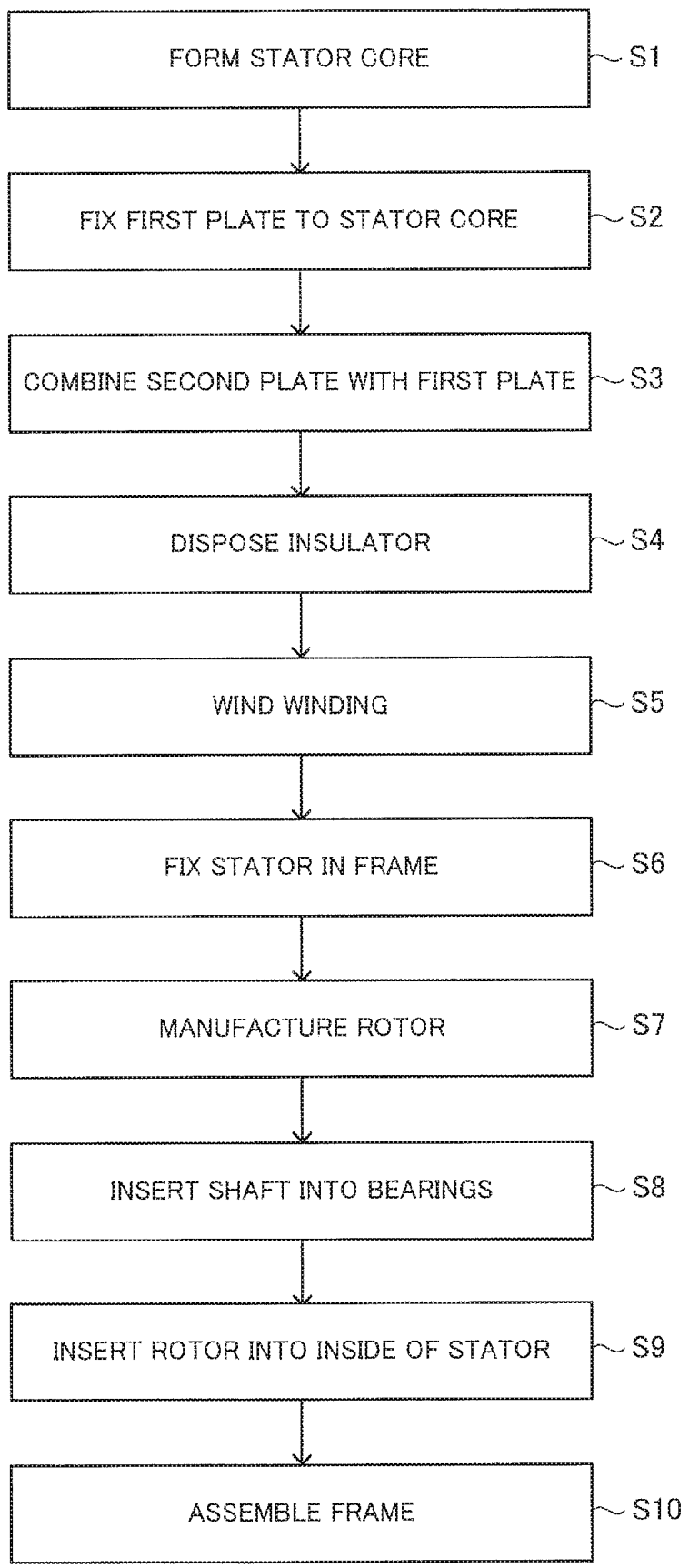
FIG. 6 is a flowchart showing an example of a process of manufacturing the electric motor.

FIG. 6 is a flowchart showing an example of a process of manufacturing the electric motor 1. The manufacturing method of the electric motor 1 includes steps described below.

In step S1, the stator core 17 is formed. For example, the stator core 17 is formed by stacking a plurality of electromagnetic steel sheets in the axial direction.

In step S2, the first plate 19 is fixed to the stator core 17. Specifically, the first base part 19a of the first plate 19 is disposed on the first side of the stator core 17 (specifically, at the first core end 17a) so that the first facing parts 19b of the first plate 19 face the rotor core 7. For example, the first base part 19a is fixed to the first core end 17a with an adhesive agent.

Figure 7:
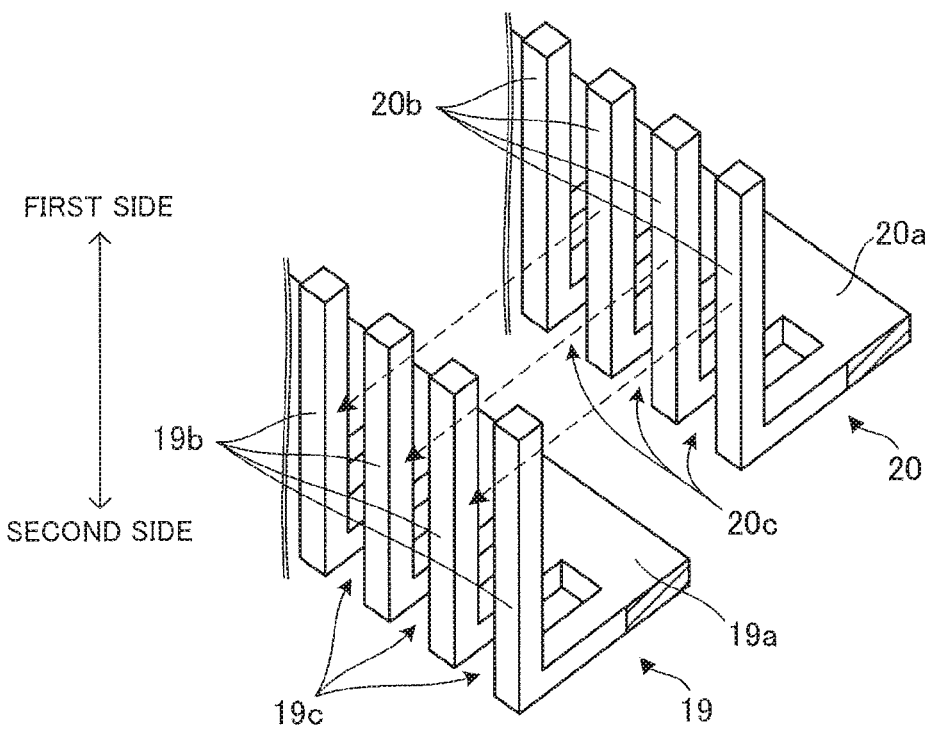
FIG. 7 is a diagram showing an example of processing in a process of manufacturing the electric motor.

FIG. 7 is a diagram showing an example of processing in step S3 of the process of manufacturing the electric motor 1.

In the step S3, the second plate 20 is combined with the first plate 19. Specifically, as shown in FIG. 7, the second plate 20 is combined with the first plate 19 so that parts of the second plate 20 (i.e., the second facing parts 20b) adjoin parts of the first plate 19 (i.e., the first facing parts 19b) in the circumferential direction with a gap in between and also face the rotor core 7. For example, the second base part 20a of the second plate 20 is fixed to the first base part 19a of the first plate 19 with an adhesive agent.

In step S4, the insulator 16 is disposed on the first side of the first plate 19 and the second plate 20, and the insulator 16 is disposed also on the second side of the stator core 17.

In step S5, the winding 18 is wound around the stator core 17 with the insulator 16 in between, the first plate 19 and the second plate 20. With this method, the stator 3 can be manufactured.

In step S6, the stator 3 is fixed in the frame 4. Specifically, the stator 3 is fixed in the frame part 4b by means of press fitting, welding or the like.

In step S7, the rotor 2 is manufactured. For example, the rotor 2 is obtained by inserting the shaft 10 into the shaft hole 11 formed through the rotor core 7. The permanent magnets 8 for forming magnetic poles may be previously attached to the rotor core 7.

In step S8, the shaft 10 is inserted into the bearings 5a and 5b.

The order of executing the step S1 to the step S8 is not limited to the order shown in FIG. 6. For example, steps from the step S1 to the step S6 and the step S7 can be executed in parallel with each other. The step S7 may be executed prior to the steps from the step S1 to the step S6.

In step S9, the compression spring 6 is placed in the bottomed part 42c of the frame part 4b, and the rotor 2 together with the bearings 5a and 5b is inserted into the inside of the stator 3. Specifically, the rotor 2 is inserted into the inside of the stator 3 so that the first rotor end 71 of the rotor core 7 is situated outwardly away from the first core end 17a of the stator core 17 in the axial direction.

In step S10, the frame 4 is assembled by combining the frame part 4a with the frame part 4b.

The electric motor 1 is assembled by the process described above.

Modification

Figure 8:
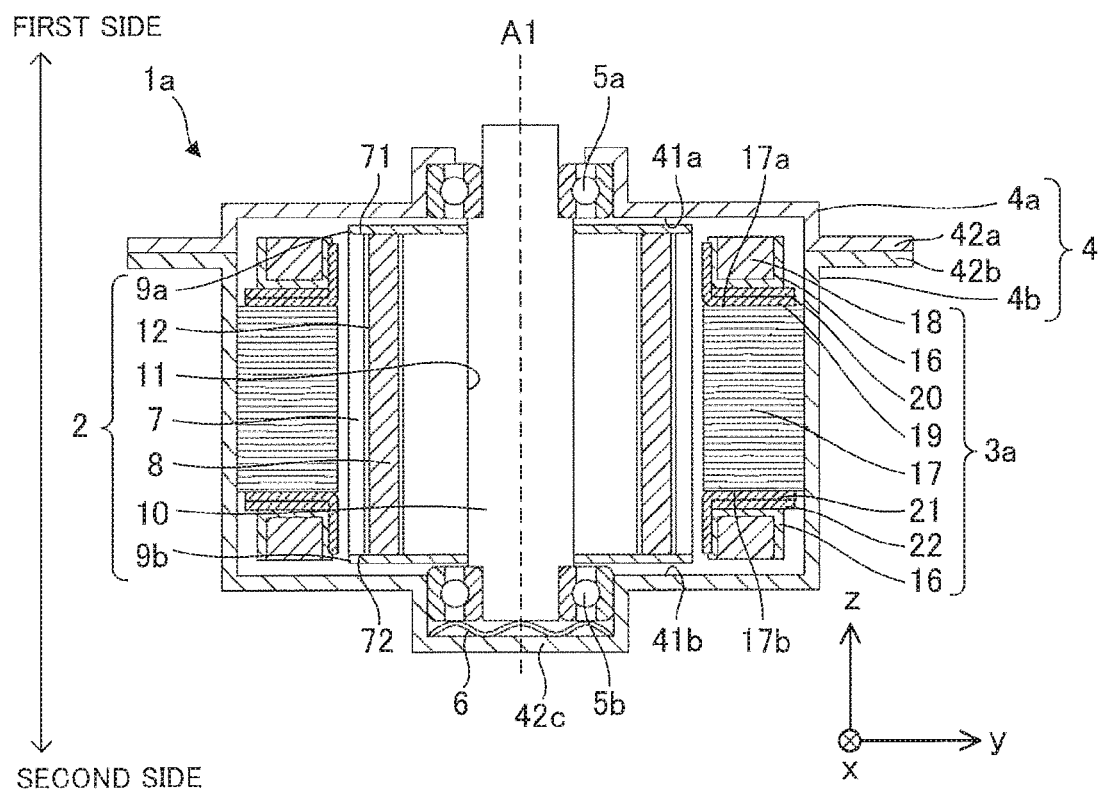
FIG. 8 is a vertical sectional view schematically showing a structure of an electric motor according to a modification.

FIG. 8 is a vertical sectional view schematically showing a structure of an electric motor 1a according to a modification.

The structure of a stator a in the electric motor 1a according to the modification differs from the structure of the stator 3 in the electric motor 1 according to the first embodiment. Specifically, the stator 3a includes a third plate 21 and a fourth plate 22 in addition to the stator core 17, the insulator 16, the winding 18, the first plate 19 and the second plate 20. Further, the second rotor end 72 of the rotor 2 is situated outwardly away from the second core end 17b of the stator core 17 in the axial direction. Except for these features, the electric motor 1a is the same as the electric motor 1.

The third plate 21 and the fourth plate 22 are disposed on the second side of the stator core 17. The fourth plate 22 is overlaid on the third plate 21 in the axial direction. Further, the insulator 16 is overlaid on the fourth plate 22 in the axial direction.

The structure of each of the third plate 21 and the fourth plate 22 is the same as the structure of the first plate 19. That is, the third plate 21 is formed in an L shape in a cross section. In other words, as shown in FIG. 8, the third plate 21 is formed so that its cross-sectional shape on a zy plane is an L shape. The shape of the third plate 21 on an xy plane is formed in the same shape as the shape of the tooth part of the stator core 17 on an xy plane, for example.

Similarly to the first plate 19 shown in FIG. 2, the third plate 21 includes a base part (referred to also as a third base part), at least one facing part (referred to also as a third facing part), and at least one slit (referred to also as a third slit). The base part of the third plate 21 is provided on the second side of the stator core 17. It is permissible even if a plurality of third plates 21 are provided on the second side of the stator core 17. The facing part of the third plate 21 faces the rotor core 7. The facing part of the third plate 21 extends in the axial direction.

The slit of the third plate 21 is formed in the radial direction between two facing parts of the third plate 21. In other words, the slit of the third plate 21 is formed inside the base part of the third plate 21 in regard to the radial direction. That is, the slit of the third plate 21 extends in the radial direction. Accordingly, in the third plate 21, a gap passing in the axial direction is formed between two facing parts adjoining each other.

The fourth plate 22 is formed in an L shape in a cross section. In other words, as shown in FIG. 8, the fourth plate 22 is formed so that its cross-sectional shape on a zy plane is an L shape. The shape of the fourth plate 22 on an xy plane is formed in the same shape as the shape of the tooth part of the stator core 17 on an xy plane, for example.

Similarly to the first plate 19 shown in FIG. 2, the fourth plate 22 includes a base part (referred to also as a fourth base part), at least one facing part (referred to also as a fourth facing part), and at least one slit (referred to also as a fourth slit). The base part of the fourth plate 22 is provided on the second side of the stator core 17. Specifically, the base part of the fourth plate 22 is overlaid on the base part of the third plate 21 in the axial direction. It is permissible even if a plurality of fourth plates 22 are provided on the second side of the stator core 17. The facing part of the fourth plate 22 faces the rotor core 7. The facing part of the fourth plate 22 extends in the axial direction.

The slit of the fourth plate 22 is formed in the radial direction between two facing parts of the fourth plate 22. In other words, the slit of the fourth plate 22 is formed inside the base part of the fourth plate 22 in regard to the radial direction. That is, the slit of the fourth plate 22 extends in the radial direction. Accordingly, in the fourth plate 22, a gap passing in the axial direction is formed between two facing parts adjoining each other.

A part of the facing part of the third plate 21 is situated in the slit of the fourth plate 22. Accordingly, similarly to the first plate 19 and the second plate 20 shown in FIG. 3, the facing part of the third plate 21 and the facing part of the fourth plate 22 adjoin in the circumferential direction with a gap in between. The facing part of the third plate 21 and the facing part of the fourth plate 22 face a part of the rotor core 7 extending outside the stator core 17 in the axial direction.

The facing part of the third plate 21, the facing part of the fourth plate 22 and an inner surface of the stator core 17 in regard to the radial direction form an inner surface of the stator 3 facing the rotor 2.

The third plate 21 includes a plurality of facing parts, and the fourth plate 22 also includes a plurality of facing parts. The facing parts of the third plate 21 and the facing parts of the fourth plate 22 are arranged alternately in the circumferential direction with a gap in between.

In the axial direction, an end of the facing part of the third plate 21, an end of the facing part of the fourth plate 22 and the second rotor end 72 coincide with each other.

As described above, the positional relationship of the fourth plate 22 with respect to the third plate 21 is the same as the positional relationship of the second plate 20 with respect to the first plate 19.

The relationship between the thickness of the base part of the third plate 21 in the axial direction and the width of the facing part of the third plate 21 in the circumferential direction is the same as the relationship between the thickness t1 of the first base part 19a of the first plate 19 and the width w1 of the first facing part 19b of the first plate 19. Similarly, the relationship between the thickness of the base part of the fourth plate 22 and the width of the facing part of the fourth plate 22 in the circumferential direction is the same as the relationship between the thickness t2 of the second base part 20a of the second plate 20 and the width w2 of the second facing part 20b of the second plate 20. The width of the facing part of the third plate 21 in the circumferential direction equals the width of the facing part of the fourth plate 22 in the circumferential direction.

Advantages of the electric motor 1 and the manufacturing method of the electric motor 1 according to the first embodiment (including the modification) will be described below.

In the electric motor 1, the first rotor end 71 is situated separate outward from the first core end 17a of the stator core 17 in the axial direction. Thus, the stator core 17 is shorter than the rotor core in the axial direction. Accordingly, the length of the winding 18 can be reduced, by which the cost for the winding 18 can be reduced and the copper loss can be reduced. Further, the electric motor 1 can be downsized. However, in general, in the case where the stator core is shorter than the rotor core in the axial direction, the motor efficiency decreases since the magnetic flux flowing from the rotor core into the stator decreases.

In this embodiment, the first facing parts 19b and the second facing parts 20b face the rotor core 1. That is, the area of the stator 3 facing the rotor core 7 increases. Accordingly, the magnetic flux from the rotor core 7 flows also into the first plate 19 and the second plate 20 in addition to the stator core 17, and the magnetic flux flowing into the stator 3 increases. Consequently, the motor efficiency of the electric motor 1 can be improved.

When no gap exists between the first facing part 19b and the second facing part 20b, eddy current loss is likely to occur in the first facing part 19b and the second facing part 20b. In contrast, in this embodiment, the first facing parts 19b and the second facing parts 20b are arranged alternately in the circumferential direction with a gap in between. With this configuration, the eddy current loss in the stator 3 can be reduced and the motor efficiency can be improved.

Further, since the second plate 20 is combined with the first plate 19, it is easy to adjust the gap between the first facing part 19b and the second facing part 20b. Compare with a structure obtained by processing one plate formed in an L shape in a cross section to form gaps or grooves in the plate, the area of the stator 3 facing the rotor core 7 can be increased and the motor efficiency can be improved with ease. Further, the processing cost can be reduced compared with the method processing one plate formed in an L shape in a cross section to form gaps or grooves in the plate.

For example, in the case where grooves are formed in one plate formed in an L shape in a cross section by performing punching processing, it is difficult to form grooves narrower than the thickness of the plate. In contrast, in his embodiment, narrow gaps can be formed between the first facing parts 19b and the second facing parts 20b with ease by combining the second plate 20 with the first plate 19. Accordingly, the eddy current loss in the stator 3 can be reduced and the motor efficiency can be improved.

When the end of the first facing part 19b, the end of the second facing part 20b and the first rotor end 71 coincide with each other in the axial direction, leakage of magnetic flux from the rotor core 7 can be reduced. That is, a lot of magnetic flux flows from the rotor core 7 into the stator 3 even when the stator 3 is downsized. Accordingly, the motor efficiency of the electric motor 1 can be improved.

The relationship between the thickness t1 of the first base part 19a and the width w of the first facing part 19b satisfies w1≥(2/3)×t1. Similarly, the relationship between the thickness t2 of the second base part 20a and the width w2 of the second facing part 20b satisfies w2≥(2/3)×t2. With this configuration, the first plate 19 and the second plate 20 can be formed with ease by press work (e.g., punching processing). Consequently, the processing cost can be reduced and the processing accuracy can be increased compared with cutting work.

Figure 9:
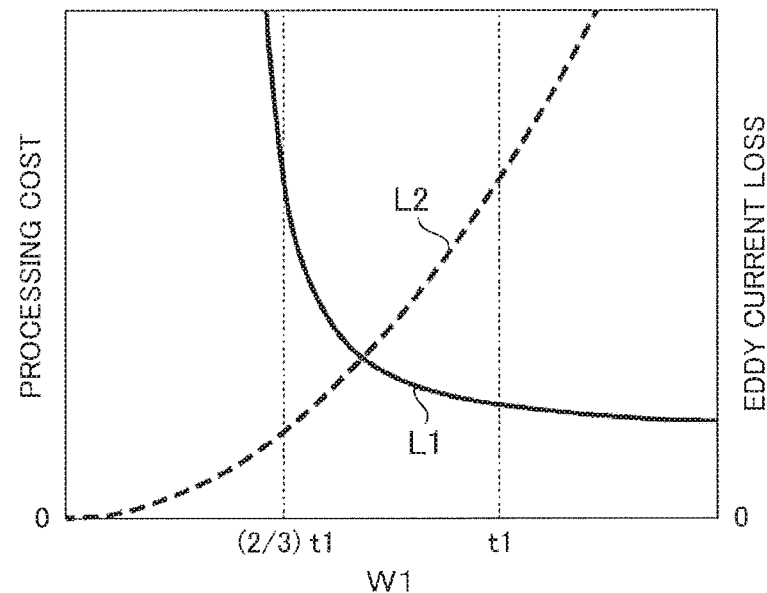
FIG. 9 is a diagram showing the amount of a processing cost and the amount of eddy current loss with respect to the width of a first facing part of the first plate.

FIG. 9 is a diagram showing the amount of the processing cost and the amount of the eddy current loss with respect to the width w1 of the first facing part 19b of the first plate 19. A first axis (i.e., vertical axis on the left side) shown in FIG. 9 represents the amount of the processing cost, and a second axis (i.e., vertical axis on the right side) represents the amount of the eddy current loss occurring in the first plate 19. That is, the curve L1 indicates the amount of the processing cost with respect to the width w1, and the curve L2 indicates the amount of the eddy current loss with respect to the width w1.

For example, it is possible to process the first plate 19 to satisfy t1≥w1≥(2/3)×t1 by use of fine blanking. However, in a range where the width w1 is close to (2/3)×t1, the processing cost is high as shown in FIG. 9 since it is necessary to increase the precision of the mold. The processing cost decreases with the increase in the width w1.

As shown in FIG. 9, the processing cost can be reduced effectively when the width w1 is greater than or equal to (2/3)×t1. However, in a range where w1>t1, the effect of reducing the processing cost is weak since the precision of the mold is moderated. On the other hand, the amount of the eddy current loss in the first plate 19 increases proportionally to the square of the width w1. Accordingly, the eddy current loss in the first plate 19 increases with the increase in the width w1 as shown in FIG. 9.

As shown in FIG. 9, when the relationship between the thickness t1 of the first base part 19a and the width w1 of the first facing part 19b satisfies t1≥w1≥(2/3)×t1, it is possible to reduce the eddy current loss in the first plate 19 while the processing cost of the first plate 19 is reduced. The second plate 20 has properties the same as the properties of the first plate 19 shown in FIG. 9. Therefore, when the relationship between the thickness t2 of the second base part 20a and the width w2 of the second facing part 20b satisfies t2≥w2≥(2/3)×t2, it is possible to reduce the eddy current loss in the second plate 20 while the processing cost of the second plate 20 is reduced similarly to the case of the first plate 19.

Further, the first slit 19 is formed inside the first base part 19a in regard to the radial direction and the second slit 20c is formed inside the second base part 20a in regard to the radial direction. With this configuration, in the state in which the second plate 20 is combined with the first plate 19, a gap passing in the axial direction can be formed between the first facing part 19b and the second facing part 20b adjoining each other. Consequently, the eddy current loss in the stator 3 can be reduced and the motor efficiency can be improved.

By integrating the second plate 20 with the first plate 19 by use of the resin 23, displacement of the first plate 19 and the second plate 20 can be prevented. Further, in the case where the resin 23 is provided between the first plate 19 and the winding 18 and between the second plate 20 and the winding 18, the first plate 19 and the second plate 20 can be insulated without the need of using the insulator 16. In this case, the resin 23 is a material that insulates the first plate 19 and the second plate 20. Thus, by using the resin 23 in place of the insulator 16, the number of components and the component cost are reduced and the displacement of the first plate 19 and the second plate 20 can be prevented.

In the electric motor 1a according to the modification, the second rotor end 72 of the rotor 2 is situated outwardly away from the second core end 17b of the stator core 17 in the axial direction. That is, both ends of the rotor core 7 in the axial direction are situated outwardly away from the stator core 17 in the axial direction. Accordingly, compared with the electric motor 1 according to the first embodiment, the length of the winding 18 can be reduced, by which the cost for the winding 18 can be reduced and the copper loss can be reduced. Further, the electric motor 1a can be downsized compared with the electric motor 1 according to the first embodiment.

In the modification, the facing part of the third plate 21 and the facing part of the fourth plate 22 face the rotor core 7. With this configuration, the decrease in the magnetic flux flowing from the rotor core 7 into the stator 3a can be prevented and the motor efficiency of the downsized electric motor 1a can be improved.

According to the manufacturing method of the electric motor 1, by combining the second plate 20 with the first plate 19, the area of the stator 3 facing the rotor core 7 can be increased and it is easy to adjust the gap between the first plate 19 (specifically, the first facing part 19b) and the second plate 20 (specifically, the second facing part 20b) in the circumferential direction. With this method, the eddy current loss in the stator 3 can be reduced and the motor efficiency can be improved. Further, according to this method, as mentioned earlier, compared with the method of processing one plate to form gaps in the plate, the processing cost can be reduced more and narrow gaps can be formed more easily between the first plate 19 and the second plate 20.

Second Embodiment

An air conditioner 50 according to a second embodiment of the present invention will be described below.

Figure 10:
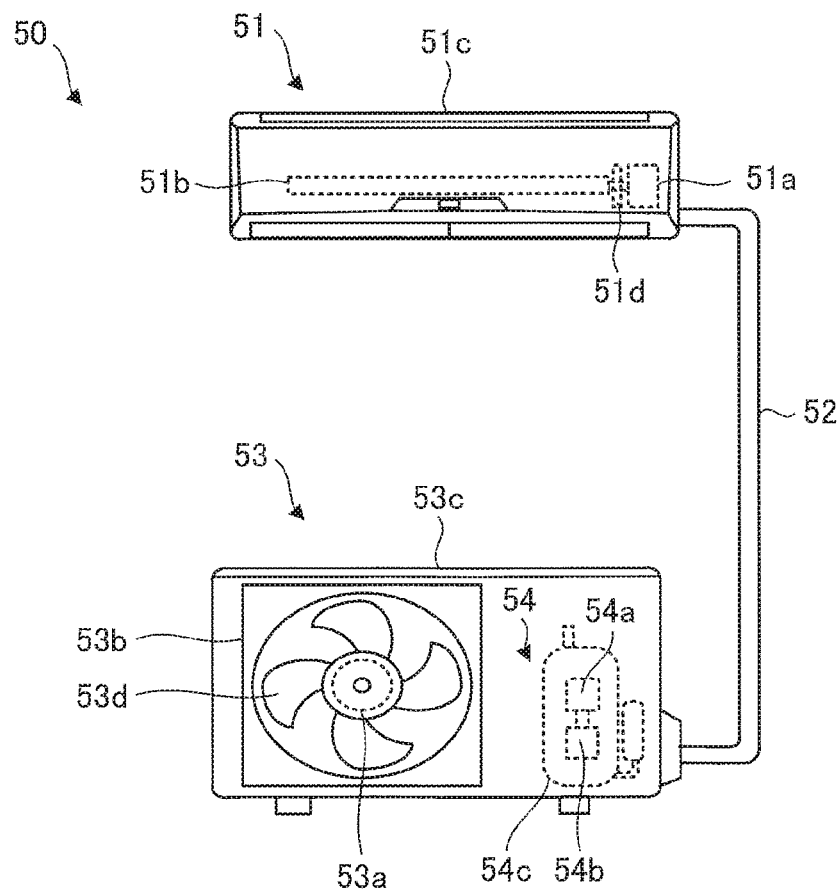
FIG. 10 is a diagram schematically showing a configuration of an air conditioner according to a second embodiment of the present invention.

FIG. 10 is a diagram schematically showing a configuration of the air conditioner 50 according to the second embodiment of the present invention.

The air conditioner 50 according to the second embodiment (e.g., refrigeration air conditioner) includes an indoor unit 51 as a blower (first blower), refrigerant piping 52, and an outdoor unit 53 as a blower (second blower) connected to the indoor unit 51 by the refrigerant piping 52.

The indoor unit 51 includes an electric motor 51a (e.g., the electric motor 1 according to the first embodiment), a blower unit 1b that blows out air by being driven by the electric motor 51a, and a housing 51c that covers the electric motor 51a and the blower unit 51b. The blower unit 51b includes, for example, a blade 51d driven by the electric motor 51a. For example, the blade 51d is fixed to a shaft of the electric motor 51a (e.g., the shaft 10) and generates an airflow.

The outdoor unit 53 includes an electric motor 53a (e.g., the electric motor 1 according to the first embodiment), a blower unit 53b, a compressor 54 and a heat exchanger (not shown) The blower unit 5.b blows out air by being driven by the electric motor 53a. The blower unit 53b includes, for example, a blade 53d driven by the electric motor 53a. For example, the blade 53d is fixed to a shaft of the electric motor 53a (e.g., the shaft 10) and generates an airflow. The compressor 54 includes an electric motor 54a (e.g., the electric motor 1 according to the first embodiment), a compression mechanism 54b (e.g., refrigerant circuit) driven by the electric motor 54a, and a housing 54c that covers the electric motor 54a and the compression mechanism 54b.

In the air conditioner 50, at least one of the indoor unit 51 or the outdoor unit 53 includes the electric motor 1 described in the first embodiment (including the modification). Specifically, the electric motor 1 described in the first embodiment is employed for at least one of the electric motors 51a or 53a as the drive source for the blower unit. It is also possible to employ the electric motor 1 described in the first embodiment (including the modification) as the electric motor 54a of the compressor 54.

The air conditioner 50 is capable of performing a cooling operation of blowing out cool air from the indoor unit 51, a heating operation of blowing out warm air from the indoor unit 51, or the like, for example. In the indoor unit 51, the electric motor 51a is the drive source for driving the blower unit 51b. The blower unit 51b is capable of blowing out conditioned air.

In the air conditioner 50 according to the second embodiment, the electric motor 1 described in the first embodiment (including the modification) is employed for at least one of the electric motors 51a or 53a, and thus advantages the same as those described in the first embodiment can be obtained. Accordingly, the efficiency of the air conditioner 50 can be improved.

Further, by employing the electric motor 1 according to the first embodiment (including the modification) as the drive source of a blower (e.g., the indoor unit 51), advantages the same as those described in the first embodiment can be obtained. Accordingly, the efficiency of the blower can be improved. A blower including the electric motor 1 according to the first embodiment and a blade (e.g., the blade 51d or 53d) driven by the electric motor 1 is usable independently as a device for blowing out air. This blower is applicable also to equipment other than an air conditioner 50.

Furthermore, by employing the electric motor 1 according to the first embodiment (including the modification) as the drive source of the compressor 54, advantages the same as those described in the first embodiment can be obtained. Accordingly, the efficiency of the compressor 54 can be improved.

The electric motor 1 described in the first embodiment can be mounted not only on an air conditioner 50 but also on equipment having a drive source, such as a ventilating fan, a household electrical appliance and a machine tool.

Features in the embodiments and the modification described above can be appropriately combined with each other.

DESCRIPTION OF REFERENCE CHARACTERS 1, 51a, 54a: electric motor, 2: rotor, 3: stator, 4: frame, 5a, 5b: bearing, 6: compression spring, 7: rotor core, 16: insulator, 17: stator core, 17a: first core end, 17b: second core end, 18: winding, 19: first plate, 19a: first base part, 19b: first facing part, 19c: first slit, 20: second plate, 20a: second base part, 20b: second facing part, 20c: second slit, 21: third plate, 22: fourth plate, 23: resin, 50: air conditioner, 51: indoor unit, 53: outdoor unit, 54 compressor, 54b: compression mechanism, 71: first rotor end, 72: second rotor end.

What is claimed is:
1. An electric motor comprising:
  a stator including a stator core having a first core end situated on a first side in an axial direction and a second core end situated on a second side opposite to the first side in the axial direction, a first plate formed in an L shape in a cross section, and a second plate formed in an L shape in a cross section; and a rotor disposed inside the stator and including a rotor core, a first rotor end situated on the first side of the rotor core, and a second rotor end situated on the second side of the rotor core, wherein
the rotor core is longer than the stator core in the axial direction,
the first rotor end is situated outwardly away from the first core end in the axial direction,
the first plate and the second plate are disposed on the first side of the stator core,
the first plate includes:
a first facing part facing the rotor core; and
a first base part provided on the first side of the stator core,
the second plate includes:
a second facing part facing the rotor core; and
a second base part provided on the first side of the stator core, and
the first facing part and the second facing part adjoin in a circumferential direction with a gap in between.

2. The electric motor according to claim 1, wherein in the axial direction, an end of the first facing part, an end of the second facing part, and the first rotor end coincide with each other.

3. The electric motor according to claim 1, wherein $w1 \geq (2/3) \times t1$ is satisfied where t1 represents a thickness of the first base part in the axial direction and w1 represents a width of the first facing part in the circumferential direction.

4. The electric motor according to claim 3, wherein $t1 \geq w1$ is satisfied.

5. The electric motor according to claim 1, wherein $w2 \geq (2/3) \times t2$ is satisfied where t2 represents a thickness of the second base part in the axial direction and w2 represents a width of the second facing part in the circumferential direction.

6. The electric motor according to claim 5, wherein $t2 \geq w2$ is satisfied.

7. The electric motor according to claim 1, wherein $w1 = w2$ is satisfied where w1 represents a width of the first facing part in the circumferential direction and w2 represents a width of the second facing part in the circumferential direction.

8. The electric motor according to claim 1, wherein the first plate has a first slit formed inside the first base part in regard to a radial direction.

9. The electric motor according to claim 1, wherein the second plate has a second slit formed inside the second base part in regard to a radial direction.

10. The electric motor according to claim 9, wherein a part of the first facing part is situated in the second slit.

11. The electric motor according to claim 1, wherein the stator includes:
a winding; and
a resin that integrates the second facing part with the first facing part,
wherein the resin is provided between the first plate and the winding and between the second plate and the winding.

12. The electric motor according to claim 1, wherein
the second rotor end is situated outwardly away from the second core end in the axial direction,
the stator includes a third plate formed in an L shape in a cross section and a fourth plate formed in an L shape in a cross section,
the third plate and the fourth plate are disposed on the second side of the stator core,
the third plate includes:
a third facing part facing the rotor; and
a third base part provided on the second side of the stator core,
the fourth plate includes:
a fourth facing part facing the rotor; and
a fourth base part provided on the second side of the stator core, and
the third facing part and the fourth facing part adjoin in the circumferential direction with a gap in between.

13. A compressor comprising:
an electric motor and
a compression mechanism driven by the electric motor, wherein
the electric motor includes:
a stator including a stator core having a first core end situated on a first side in an axial direction and a second core end situated on a second side opposite to the first side in the axial direction, a first plate formed in an L shape in a cross section, and a second plate formed in an L shape in a cross section; and
a rotor disposed inside the stator and including a rotor core, a first rotor end situated on the first side of the rotor core, and a second rotor end situated on the second side of the rotor core, wherein
the rotor core is longer than the stator core in the axial direction,
the first rotor end is situated outwardly away from the first core end in the axial direction,
the first plate and the second plate are disposed on the first side of the stator core,
the first plate includes:
a first facing part facing the rotor core; and
a first base part provided on the first side of the stator core,
the second plate includes:
a second facing part facing the rotor core; and
a second base part provided on the first side of the stator core, and
the first facing part and the second facing part adjoin in a circumferential direction with a gap in between.

14. An air conditioner comprising:
an indoor unit; and
an outdoor unit connected to the indoor unit, wherein
at least one of the indoor unit or the outdoor unit includes an electric motor, wherein
the electric motor includes:
a stator including a stator core having a first core end situated on a first side in an axial direction and a second core end situated on a second side opposite to the first side in the axial direction, a first plate formed in an L shape in a cross section, and a second plate formed in an L shape in a cross section; and
a rotor disposed inside the stator and including a rotor core, a first rotor end situated on the first side of the rotor core, and a second rotor end situated on the second side of the rotor core, wherein
the rotor core is longer than the stator core in the axial direction,
the first rotor end is situated outwardly away from the first core end in the axial direction,
the first plate and the second plate are disposed on the first side of the stator core,
the first plate includes:
a first facing part facing the rotor core; and
a first base part provided on the first side of the stator core,
the second plate includes:
a second facing part facing the rotor core; and
a second base part provided on the first side of the stator core, and the first facing part and the second facing part adjoin in a circumferential direction with a gap in between.

15. A manufacturing method of an electric motor including: a stator including a stator core having a first core end situated on a first side in an axial direction and a second core end situated on a second side opposite to the first side in the axial direction, a first plate formed in an L shape in a cross section, and a second plate formed in an L shape in a cross section; and a rotor including a rotor core that is longer than the stator core in the axial direction, a first rotor end situated on the first side of the rotor core, and a second rotor end situated on the second side of the rotor core, the manufacturing method comprising:
- disposing the first plate on the first core end so as to face the rotor core;
- combining the second plate with the first plate so that a part of the second plate adjoins a part of the first plate in a circumferential direction with a gap in between and also faces the rotor core; and
- inserting the rotor into an inside of the stator so that the first rotor end is situated outwardly away from the first core end in the axial direction.

\* \* \* \* \*